United States Patent [19]

Carney et al.

[11] Patent Number: 5,407,390
[45] Date of Patent: Apr. 18, 1995

[54] BASKET STRUCTURE FOR A COTTON HARVESTER

[75] Inventors: Wesley G. Carney; Jeffrey J. Ringwald, both of Ankeny; Timothy A. Deutsch, Newton, all of Iowa

[73] Assignee: Deere & Company, Moline, Ill.

[21] Appl. No.: 162,731

[22] Filed: Dec. 6, 1993

[51] Int. Cl.6 ................... A01D 57/20; A01D 75/02
[52] U.S. Cl. ............................. 460/119; 56/473.5; 298/1 B; 298/17 S
[58] Field of Search .............. 460/119, 15; 56/28, 56/473.5; 298/17 S, 1 B

[56] References Cited

U.S. PATENT DOCUMENTS

| | | | |
|---|---|---|---|
| 2,723,769 | 11/1955 | Fergason . | |
| 2,862,342 | 12/1958 | Fergason . | |
| 3,712,675 | 1/1973 | Schoenwald | 298/17.5 X |
| 4,129,222 | 12/1978 | Richardsson | 298/1 B X |
| 4,430,038 | 2/1984 | Rempel et al. | 414/346 |
| 4,520,617 | 6/1985 | Fachini et al. | 56/16.6 |
| 4,662,160 | 5/1987 | Hubbard et al. | 56/16.6 |

Primary Examiner—Terry Lee Melius

[57] ABSTRACT

A cotton basket is pivotally connected to a harvester frame for rocking about a fore-and-aft extending axis located a substantial distance above the basket floor on the side of the basket opposite the dump side. Simple single beam mast structures at the front and rear ends of the basket replace more conventional and massive multi-element mast structures typical in previously available harvesters. Cylinders connected near the center of gravity at the basket ends rock the basket upwardly and outwardly about the axis to a position above the wagon or module builder. The pivot angle through which the basket is rocked is substantially less than 30 degrees for minimal shifting of the center of gravity during dumping. Dump height is controlled by cylinder extension. The main conveyor floor has front and rear conveyors which move cotton to an independently controlled conveyor built into a fold-down door. The door conveyor can be emptied independently of the main conveyor operation for a partial dump.

20 Claims, 3 Drawing Sheets

BASKET STRUCTURE FOR A COTTON HARVESTER

BACKGROUND OF THE INVENTION

1) Field of the Invention

The present invention relates generally to a cotton harvester and, more specifically, to an improved basket and basket unloading system for such a harvester. 2) Related Art Cotton harvesters include a large cotton receptacle or basket supported on the main frame for receiving cotton during harvesting. Dumping the basket into a wagon or module builder typically involves either pivoting the entire filled basket approximately 90 degrees about a fore-and-aft extending dump-side pivotal axis and discharging cotton through a raised lid portion, such as shown for example in U.S. Pat. No. 4,662,160, or raising the basket vertically in a level position and conveying the packed cotton out a side discharge opening such as is shown and described in U.S. Pat. No. 4,520,617. In a third type of basket arrangement, which is shown is U.S. Pat. Nos. 2,862,342 and 2,723,769, the dump side of the basket is pivoted upwardly about a fore-and-aft extending axis located near the basket floor at the side of the basket opposite the dump side.

There is a substantial shift in the center of gravity with a conventional pivoting basket, and a side conveyor provides further weight distribution problems. Additionally, the dump height is fixed with such a pivoting basket. The mast and pivot assemblies supporting the basket bear increased loads during dumping and have to be quite massive. Although ballasting and stabilizer cylinders have been added to the harvester to alleviate problems caused by the shift in center of gravity, basket volume is still limited by the shift. Also, a relatively complex pivoting lid structure is required to provide a dump opening. Since compacting augers are supported by both the pivoting and non-pivoting portions of the lid structure, an additional auger drive motor is also necessary. Trash accumulated on the tops of such baskets often falls into the cotton as the basket pivots towards the dump side. Substantial basket rigidity is required to keep the pivoting basket square.

Baskets which are raised vertically in a level position require relatively complicated and expensive lift structure. Because the basket must be lifted a substantial distance for unloading into a module builder, the corresponding upward shift in center of gravity of the basket can lead to stability problems. Accurately unloading the vertically raised or pivoting basket into the front and rear of the module builder during the topping off process is difficult, and often cotton falls to ground and must be picked up by hand.

Previously suggested configurations with baskets which are pivoted about an axis near the floor required basket rotations of at least approximately 30 degrees to provide sufficient height for dumping into a module builder or other receiving device. With the pivot generally level with the dump edge of the basket, any rotation upwardly from the field-working position resulted in the dump edge moving laterally inwardly relative to the dump side of the harvester so that a longer side conveyor extension had to be used to move the cotton over the receiving device during dumping. The floor pivot baskets also were difficult to unload with sufficient precision for topping off the receiving device.

BRIEF SUMMARY OF THE INVENTION

It is therefore an object of the present invention to provide an improved cotton harvester basket structure. It is another object to provide such a structure which overcomes most or all of the aforementioned problems.

It is a further object to provide an improved cotton harvester basket structure having better stability during unloading than at least most of the previously available types of baskets. It is yet another object to provide such a structure which has an adjustable dump position.

It still another object of the invention to provide an improved cotton harvester basket structure having a simple lid construction. It is a further object to provide such a structure having an improved unloading conveyor and conveyor control system for more easily topping off a module builder or other receiving device.

It is a further object of the invention to provide an improved cotton harvester basket structure wherein basket capacity is not limited by stability. It is another object to provide such a basket structure wherein the center of gravity of the filled basket shifts very little during dumping. It is another object to provide such a basket with a lift arrangement which minimizes loading of the pivot and mast structure which connects the basket to the harvester frame, thereby minimizing the size of connecting components.

It is still another object of the present invention to provide an improved cotton harvester pivoting basket structure, wherein the pivot is located on the side of the harvester opposite the dump side. It is another object to provide such a basket wherein the pivot is offset above the basket floor to improve dump side reach during unloading.

A telescoping cotton basket is pivotally connected to a pair of single beams extending upwardly and outwardly from a harvester frame for rocking about a fore-and-aft extending axis located a substantial distance above the basket floor on the side of the basket opposite the dump side, rather than on the dump side of the basket as had been common in the past. Dump cylinders, connected between the frame and the basket near the basket center of gravity, rock the basket upwardly and outwardly about the pivot to a position above the wagon or module builder. The pivot angle through which the basket is rocked is variable to adjust dump height over an expanded range of heights, with nearly a foot of additional adjustment available at each end of the range when compared with previous dumping baskets. The maximum dump angle is substantially less than 30 degrees and preferably less than 24 degrees maximum so there is little shift in basket center of gravity (almost negligible horizontal shift and less than 2.5 feet of vertical shift). The basket lid is now solid because no pivoting of the lid is required for dumping, and all the basket augers are in fixed positions for stability and for elimination of the second conveyor motor that otherwise was needed to drive the lid conveyor. The solid lid and the fact that the basket stays closer to the field-working position during dumping results in the need for less structural rigidity compared to previously available basket structures, and size is not limited by stability problems. In addition, the telescoping upper basket section is no longer lopsided so that moving it to and from the field-working position is easier than with previous lid structures with pivoting lids.

The basket tilts toward the side of the harvester opposite the dump side so the problem of falling trash entering the cotton is essentially eliminated. The cylinder connection at the center of gravity greatly reduces the loads on the single basket support beams and pivot area so less massive mast and pivot structures are required.

The main conveyor floor has independently controlled front and rear conveyors which move cotton to a fold-down door conveyor. The three conveyors selectively unload front and rear portions of the basket for accurate topping off of the module builder without cotton loss. Partial dumps are better facilitated since the door conveyor can be emptied independently of the main floor conveyor. Also, cotton can be pushed back into the basket as the conveyor is moved to the closed harvesting position. The door conveyor and tilting basket provide excellent side dumping reach, even for harvesters with up to six row capacity.

These and other objects, features and advantages of the present invention will become apparent to one skilled in the art upon reading the following detailed description in view of the drawings.

DETAILED DESCRIPTION OF THE DRAWINGS

Figure 1:
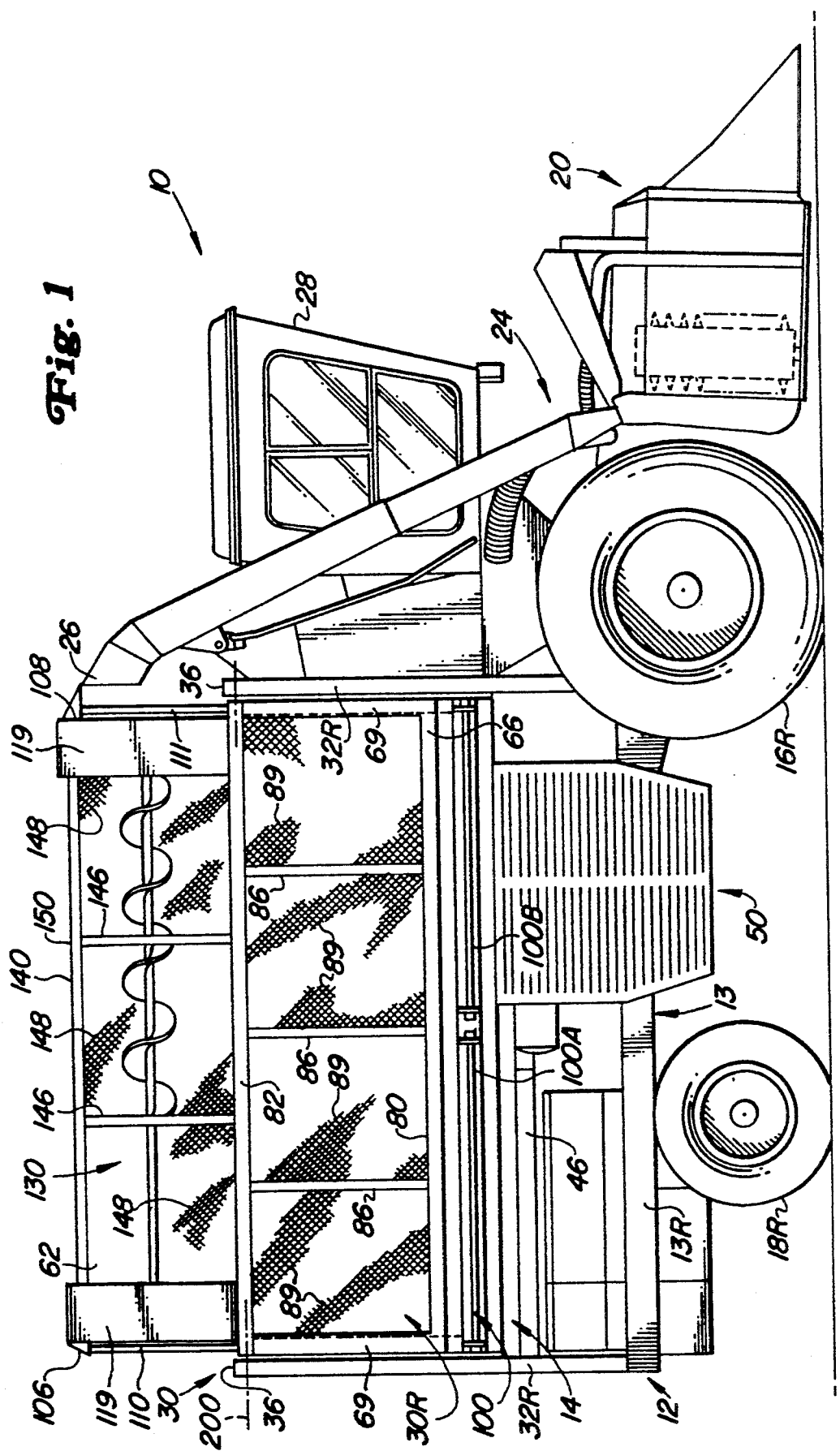
FIG. 1 is a side view of a cotton harvester with a pivoting low-lift basket.

Referring now to FIG. 1, therein is shown a cotton harvester 10 having a main frame 12 with lower and upper generally rectangular frame sections 13 and 14 supported for forward movement over the ground by left- and right-hand front drive wheels 16L and 16R and by rear steerable wheels 18L and 18R. Cotton harvesting structure 20 is supported at the forward end of the main frame 12 for removing cotton from plants, and an air system indicated generally at 24 directs the harvested cotton rearwardly and upwardly to a discharge area 26 behind a cab 28. A cotton basket 30 receives the cotton discharged from the area 26. As shown in the Figures, the basket 30 has a dump side 30L (the left side of the machine as viewed in the forward direction) and an opposite side 30R (the right side).

Figure 2:
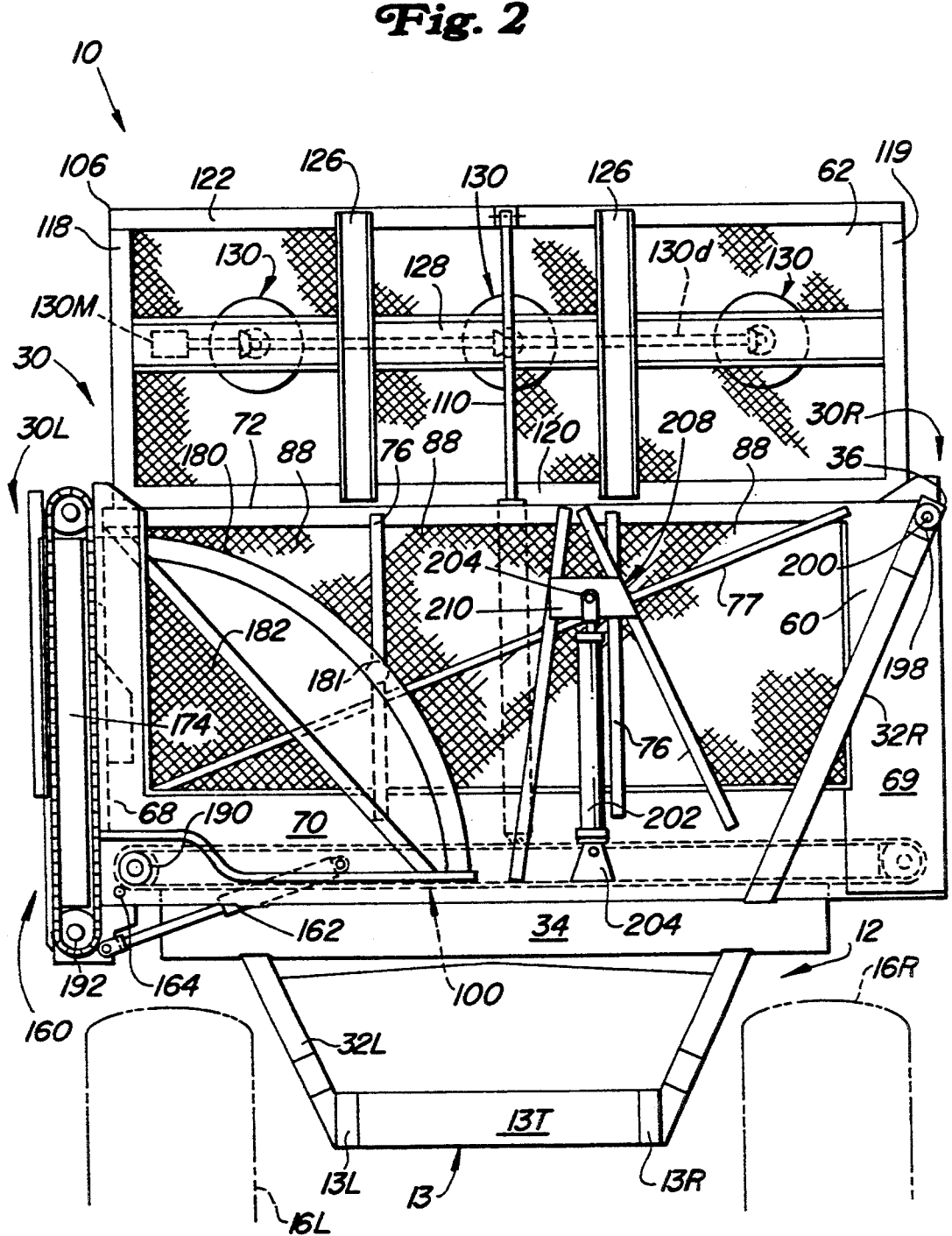
FIG. 2 is a an enlarged rear view of a portion of the harvester of FIG. 1 showing the basket in the field-working position.
Figure 3:
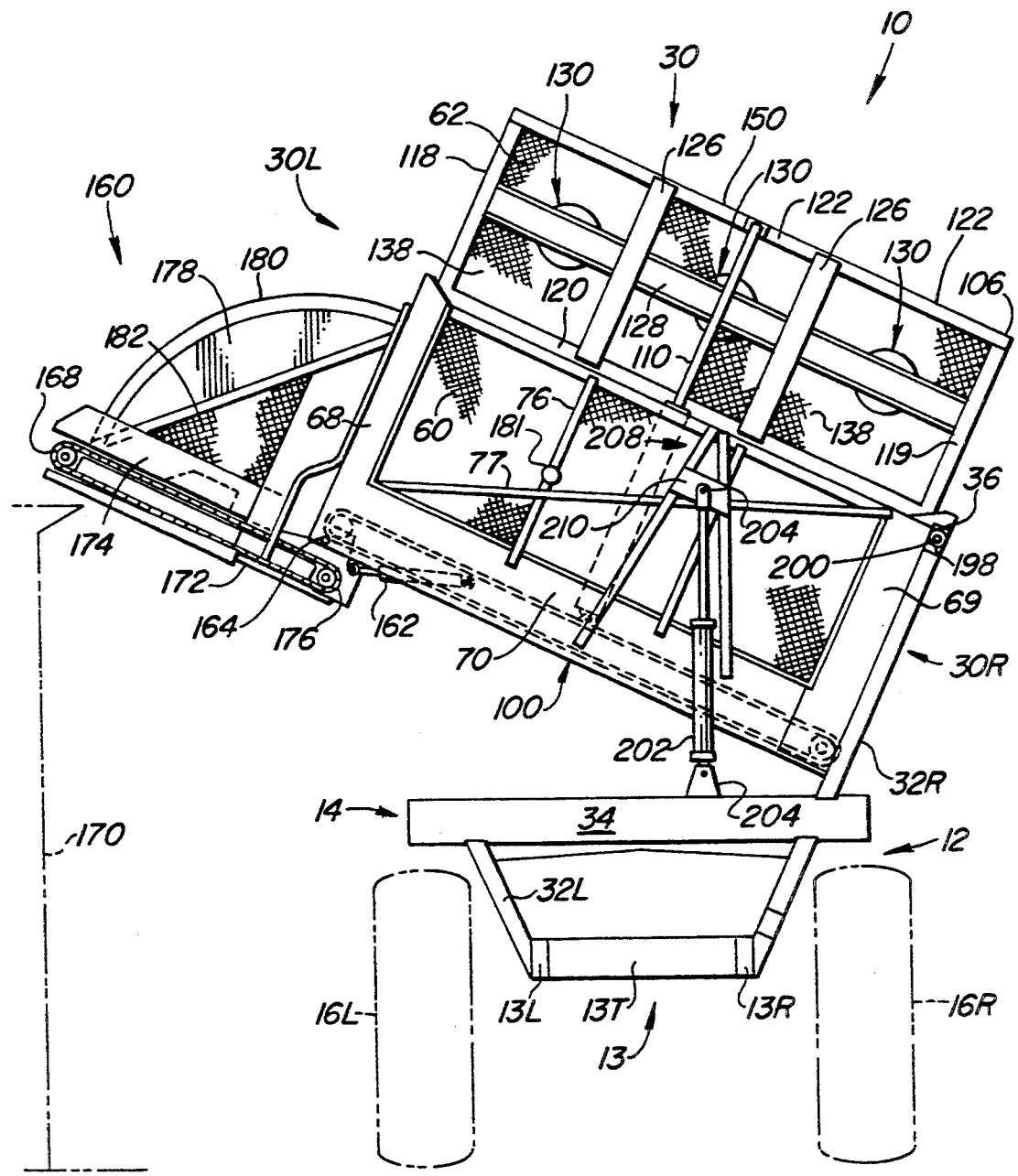
FIG. 3 is a view similar to FIG. 2 but showing the basket rocked about the basket pivot axis into the uppermost unloading position with the dump-side door conveyor lowered.

The section 13 of the frame 12 includes main fore-and-aft extending horizontal beams 13L and 13R connected by transverse beams 13T. Lower ends of upright tubular beams 32L and 32R are fixed to the beams 12L and 12R and diverge in the upward direction. As seen in FIGS. 2 and 3, the beams 32L and 32R are connected by a transversely extending cross frame member 34 just below the level of the bottom of the basket 30. A forward connecting structure (not shown) also extends between the forward beams 12L and 12R to define the forward portion of the lower frame structure 13. The left upright beam 32L terminates at a connection with the member 34, and the right beam 32R extends upwardly and outwardly to a pivot connecting portion 36 at the side 30R opposite the dump side 30L at a height slightly below the top of the cab 28 (FIG. 1). The upper rectangular frame section 14, located just below the bottom of the basket 30 and supported parallel to the lower frame structure 13, includes left and right transversely spaced side beams 46 connected to the outer ends of the cross frame member 34 and to the forward connecting structure. An engine, fan and hydraulic pump structure, as well as other conventional harvester components, are supported from the frame 12 at a location indicated generally at 50 between the wheels 16 and 18.

The basket 30 includes a box-like lower basket portion 60 closed on three sides for containing cotton, and an upper basket portion 62 telescopingly received within the portion 60 for movement between a lowered transport position and a raised field-working position (shown). The lower basket portion 60 includes a framework 66 having front and rear dump side corner posts 68 and opposite side corner posts 69 joined by transversely extending lower panels 70. The upper ends of each set of corner posts 68,69 are connected by an angle 72, and vertical supports 76 extend between the panel 70 and the angle 72. A diagonal brace 77 extends from the lower end of the post 68 to the upper end of the post 69. The right side (side opposite the dump side 30L of the basket 30) of the lower basket portion 60 as best seen in FIG. 1 includes lower and upper fore-and-aft extending frame members 80 and 82 connecting the corner posts 69. Vertical supports 86 extend between the members 80 and 82 between the posts 69. The dump side 30L of the lower basket portion 62 opens outwardly. Wire screens or mesh panels 88 and 89 are secured to the remaining three sides of the framework 66 to define a lower cotton-receiving area which opens outwardly towards the dump side 30L. The lower cotton-receiving area is closed at the bottom by floor conveyor structure indicated generally at 100.

The upper basket portion 62 includes a framework 106 which is supported by the lower framework 66 and has generally a box-like construction closed to cotton at the top and sides and the aft end. The basket portion 62 has a front 108 (FIG. 1) which opens forwardly near the top of the basket to receive cotton blown rearwardly from the discharge area 26. An open bottom communicates with the lower basket portion 60. A rear center extension cylinder 110 (FIG. 2) and two forward cylinders 111 (FIG. 1) are located inside the lower basket portion 60 but outside the upper portion 60 to raise and lower the basket portion 62 between the field-working and transport positions. Alternatively, the basket 30 can be a fixed, non-telescoping structure.

The upper framework 106 includes corner posts 118 and 119 at the front and rear ends of the basket which are joined at each end by lower and upper transverse members 120 and 122. Upright support beams 126 extend between the members 120 and 122, and a transverse beam 128 is fixed to the members 120 and 122 and beams 126. Three fore-and-aft extending compacting augers 130 are supported from the front and rear beams 128 for moving and compacting the cotton blown in from the discharge area 26 through the openings above the transverse beam 128 and on either side of the upright beams 126 at the front of the basket. A single hydraulic drive motor 130M with a single shaft pinion drive 130D is used to power the augers. Mesh panels fixed to the beams 126 and 128 and to the members 120 and 122 close the aft end of the framework 106 to cotton. Similar mesh panels (not shown) secured between the beam 128 and the lower member 120 at the front of the framework 106 close the basket below the cotton-receiving openings. Lower and upper fore-and-aft extending frame members 140 extend between the corner posts 118 and 119. Upright members 146 extend between the members 140, and mesh panels 148 secured to the members 140 and 146 and the posts 118 and 119 close the sides of the upper basket portion 62 to cotton. Mesh panels at top 150 of the basket close the upper portion of the basket 30. The mesh panels also add structural rigidity to the basket 30.

Dump side door structure 160 is pivotally connected to the lower basket portion 60 for rocking by a hydraulic cylinder 162 about a fore-and-aft axis 164 between closed position (FIG. 2) wherein the dump side opening is blocked to contain cotton, and a dump or conveying position (FIG. 3) wherein the dump side of the lower basket portion opens outwardly. The door structure 160 supports a conveyor 168 which provides a substantial outwardly directed extension of the basket floor conveyor structure 100 in the dump position. In the dump position, the conveyor 168 extends from a position below the outer portion of the conveyor structure 100 (FIG. 3) in a direction parallel to the plane of the bottom of the basket portion 60 to a dump-side end several feet outwardly of the left drive wheel 16L so that convenient unloading into a module builder 170 or similar device is facilitated.

The door structure 160 includes a conveyor floor structure 172 connected between a pair of side frame structures 174 (FIG. 3) at the front and rear of the basket 30. Each of the structures 174 includes a bottom support frame 176 and a side wall 178 for containing cotton at the conveyor ends during dumping. The side wall 178 is slidably received through the side of the outer corner post 68 of the lower basket portion frame and includes an arc-shaped top edge 180 with radius centered on the door pivot axis 164. In the closed position, the edge 180 contacts a plastic bumper 181 located on the support 76. A portion 182 of the side wall 178 is preferably fabricated from mesh panel which reduces weight and provides for air and trash flow from the outer lower portions of the front and rear ends of the basket 30 when the door structure is closed (FIG. 2).

The floor conveyor 100 as shown in FIG. 1 includes first and second fore-and-aft spaced slatted conveyors 100A and 100B, each driven by a hydraulic motor 190 (FIG. 2) supported at the corresponding end of the basket 30. A hydraulic motor 192 supported on the side frame member 174 drives the door conveyor 168. The two floor conveyor motors 190 and the door conveyor motor 192 are independently controllable by hydraulic drive circuits for providing controlled dumping with good topping off characteristics. For simplicity, the two floor conveyors 100A and 100B can be replaced with a single conveyor driven by one motor 192. The independently driven door conveyor 168 provides added dump control and allows the door to be completely emptied of cotton.

The basket 30 is connected near the upper right-hand corners of the lower basket portion 60 to the connecting portions 36 of the front and rear basket support beams 32R by pivot structure 198 for rocking about a fore-and-aft extending pivot axis 200 (FIG. 1) between an uppermost dump position (FIG. 3) and a normal field-working position (FIG. 2). A pair of dump cylinders 202, one at each end of the basket, rock the basket about the axis 200. The base end of the dump cylinder 202 is connected by a bracket 204 to the main frame 12 between the beams 32L and 32R. The rod end of the cylinder 202 is connected at 204 to the end of the lower basket portion 60 at or closely adjacent the center of gravity of the basket 30. As shown in FIGS. 2 and 3, an A-frame member 208 with a gusset 210 is secured to the basket end, and the rod end of the cylinder 202 is pivotally connected to the gusset 210. As best seen in FIG. 3, locating the pivot 200 opposite the dump side 30L well above the bottom of the basket 30, so that in the dump position the end of the floor conveyor approaches or is below the level of the axis, achieves additional reach towards the module builder as the bottom of the dump side of the basket rocks outwardly with extension of the cylinders 202. Substantially all of the basket floor, in both the field-working and unloading positions of the basket, is located below a horizontal plane containing the basket pivotal axis 200.

The cylinders 202 support a substantial portion of the weight of the loaded basket during dumping so that the stresses on the pivot structure 198 and the beams 32R are minimized. The above-described basket, pivot and cylinder construction also results in minimal movement of the basket center of gravity during dumping. Variable dump height is achieved simply by varying the basket angle through selected extension of the cylinders 202 in accordance with the height of the module builder 170.

Having described the preferred embodiment, it will become apparent that various modifications can be made without departing from the scope of the invention as defined in the accompanying claims.

We claim:

1. In a cotton harvester having a main frame supported for forward movement over the ground, a cotton basket structure for receiving harvested cotton and discharging the cotton from a dump side of the basket, the basket structure comprising:

a lower basket portion having a floor, front and rear end walls, a fore-and-aft extending upright outer sidewall, and a dump side structure opposite the outer sidewall, wherein the walls, sidewall and dump side structure define a cotton confinement area;

front and rear support structures connected to the main frame and extending upwardly and outwardly therefrom to basket connecting ends;

pivot structure pivotally connecting the lower basket portion to the basket connecting ends for rocking of the basket about a fore-and-aft extending pivotal axis located near the top of the outer sidewall;

a dump cylinder connected between the frame and the basket for rocking the basket about the pivotal axis between field-working and unloading positions; and conveying structure located adjacent the floor for moving cotton towards the dump side and out of the confinement area.

2. The invention as set forth in claim 1 wherein the basket is rockable in a range of pivoted positions, the maximum pivoted position being substantially less than 30 degrees from the field-working position.

3. The invention as set forth in claim 1 wherein the dump side structure includes a movable conveyor, wherein when the basket is in the field-working position the movable conveyor is located a substantial distance below a horizontal plane which contains the pivotal axis so that the conveyor moves outwardly as the basket is pivoted to the unloading position.

4. The invention as set forth in claim 3 wherein the movable conveyor is pivotally connected to basket floor near the dump side of the basket and is rockable between an upright position generally closing the side of the basket and a dump position extending outwardly from the floor conveyor.

5. The invention as set forth in claim 3 wherein the conveying structure includes a floor conveyor comprising forward and rearward conveyers supported for movement over the floor.

6. The invention as set forth in claim 1 including an upper basket portion telescopingly received by the lower basket portion, the upper basket portion defining a generally unitary lid structure.

7. The invention as set forth in claim 1 including means connecting the dump cylinder to the basket near the center of gravity of the basket for limiting the loading on the front and rear support structures during unloading.

8. The invention as set forth in claim 7 wherein the support structures each comprise a single, unitary tubing structure forming an upward extension of the harvester main frame.

9. The invention as set forth in claim 1 wherein the dump side structure includes a dump side extension, wherein the dump side extension is located a substantial distance below a horizontal plane which contains the pivotal axis so that the extension moves laterally outwardly as the basket is pivoted to the unloading position, and wherein in the dump position of the basket, a substantial portion of the extension is located below a horizontal plane which passes through the pivotal axis.

10. In a cotton harvester having a main frame supported for forward movement over the ground, a cotton basket structure for receiving harvested cotton and discharging the cotton from a dump side of the basket, the basket structure comprising:

a basket having a floor, front and rear end walls, a fore-and-aft extending upright outer sidewall, and a dump side structure opposite the outer sidewall, wherein the end walls, outer sidewall and dump side structure define with the floor a cotton confinement area, the dump side structure including a side conveyor movable between an upright position generally closing the confinement area and a conveying position extending outwardly from the sidewall;

front and rear support beams connected to the main frame and extending upwardly and outwardly therefrom to basket connecting ends;

pivot structure connecting the lower basket portion to the basket connecting ends of the beams for rocking of the basket about a fore-and-aft extending pivotal axis located a substantial distance above the floor; and front and rear dump cylinders connected between the frame and the front and rear end walls near the basket center of gravity for rocking the basket from a field-working position to an unloading position, wherein in the unloading position the basket is pivoted substantially less than 30 degrees from the field-working position.

11. The invention as set forth in claim 10 wherein the pivotal axis is located near the top of the outer sidewall.

12. The invention as set forth in claim 10 wherein the rear support beam comprises a single tube of rectangular cross section fixed to the harvester main frame.

13. In a cotton harvester having a main frame supported for forward movement over the ground, a cotton basket structure for receiving harvested cotton and discharging the cotton from a dump side of the basket, the basket structure comprising:

a lower basket portion having a floor with a floor conveyor, front and rear end walls, a fore-and-aft extending upright outer sidewall, and a dump side structure on the side of the lower basket portion opposite the outer sidewall having a closed position and an open position, the walls, sidewall and dump side structure defining a cotton confinement area;

front and rear support structure connected to the main frame and extending upwardly and outwardly therefrom to basket connecting ends;

pivot structure connecting the lower basket portion to the basket connecting ends for rocking of the basket about a fore-and-aft extending pivotal axis located near the top of the outer sidewall;

a dump cylinder connected between the frame and the basket for rocking the basket about the pivotal axis between field-working and a plurality of unloading positions including a maximum height dumping position, and wherein in the maximum height dumping position the basket is rocked substantially less than 30 degrees about the pivotal axis from the field-working position; and a conveyor located within the confinement area for moving cotton out of the confinement area towards the dump side of the basket when the dump side structure is in the open position.

14. The invention as set forth in claim 13 wherein the dump side structure includes a dump side conveyor rockable about a conveyor pivotal axis between a generally upright position corresponding to the closed position to an outwardly extending position corresponding to the open position, wherein the conveyor pivotal axis is located below a horizontal plane that passes through the basket pivotal axis.

15. The invention as set forth in claim 13 wherein in the maximum height dumping position the basket is rocked less than 25 degrees from the field-working position.

16. In a cotton harvester having a main frame supported for forward movement over the ground, a cotton basket structure for receiving harvested cotton and discharging the cotton from a dump side of the basket, the basket structure comprising:

a basket having a floor, front and rear end walls, a fore-and-aft extending upright outer sidewall, and a dump side structure opposite the outer sidewall including a dump side door movable between an open and a closed position, wherein the walls, sidewall and dump side structure define a cotton confinement area;

a basket support connected to the main frame;

means pivotally connecting the basket portion to the basket support for rocking of the basket about a pivotal axis located near the outer sidewall a substantial distance above the basket floor;

means for rocking the basket outwardly about the pivotal axis from a field-working position to an unloading position, wherein in the unloading position the dump side structure is rotated outwardly from the dump side of the frame; and a conveyor adjoining the floor for moving cotton from the confinement area outwardly to the dump side door when the door is in the open position.

17. The invention as set forth in claim 16 wherein substantially all of the basket floor, in both the field-working and unloading positions of the basket, is located below a horizontal plane containing the basket pivotal axis.

18. The invention as set forth in claim 16 wherein the conveyor comprises a floor conveyor supported adjacent the basket floor, and wherein the dump side door includes a door conveyor.

19. The invention as set forth in claim 18 wherein the floor conveyor comprises first and second independently driven conveyor portions.

20. The invention as set forth in claim 18 wherein the door conveyor includes a door conveyor drive operable independently of the conveyor adjoining the floor.

* * * * *